United States Patent
Takahashi

(10) Patent No.: US 7,403,792 B2
(45) Date of Patent: Jul. 22, 2008

(54) CELLULAR PHONE AND AUTOMATIC PROGRAM UPDATE METHOD USED THEREFOR

(75) Inventor: Toshihiko Takahashi, Tokyo (JP)

(73) Assignee: NEC Corporation (JP)

( * ) Notice: Subject to any disclaimer, the term of this patent is extended or adjusted under 35 U.S.C. 154(b) by 365 days.

(21) Appl. No.: 11/246,459

(22) Filed: Oct. 11, 2005

(65) Prior Publication Data

US 2006/0089135 A1    Apr. 27, 2006

(30) Foreign Application Priority Data

Oct. 13, 2004    (JP)    ............... 2004-298311

(51) Int. Cl.
*H04M 1/00* (2006.01)
*H04M 3/00* (2006.01)

(52) U.S. Cl. .............. 455/550.1; 455/418; 455/419; 455/3.01; 455/3.02

(58) Field of Classification Search ............. 455/550.1, 455/418–420, 3.01–3.04, 514
See application file for complete search history.

(56) References Cited

U.S. PATENT DOCUMENTS

| | | | |
|---|---|---|---|
| 5,887,254 A * | 3/1999 | Halonen | ............. 455/419 |
| 6,378,069 B1 | 4/2002 | Sandler et al. | |
| 6,687,901 B1 * | 2/2004 | Imamatsu | ............. 717/173 |
| 7,228,557 B1 * | 6/2007 | Korehisa et al. | ............. 725/86 |
| 2003/0023396 A1 * | 1/2003 | Boehm | ............. 702/119 |
| 2005/0120040 A1 * | 6/2005 | Williams et al. | ............. 707/102 |
| 2006/0258407 A1 * | 11/2006 | Chien | ............. 455/567 |

FOREIGN PATENT DOCUMENTS

| | | |
|---|---|---|
| EP | 1 206 148 A1 | 5/2002 |
| EP | 1 289 324 A1 | 3/2003 |
| JP | 2002-152821 | 5/2002 |

* cited by examiner

*Primary Examiner*—William Trost
*Assistant Examiner*—Huy Q Phan
(74) *Attorney, Agent, or Firm*—Dickstein, Shapiro, LLP.

(57) ABSTRACT

A cellular phone includes a key input determination unit, key input information storage unit, program storage unit, time decision unit, download execution unit, download execution unit, and program update unit. The key input determination unit determines whether a key input is done, and outputs a determination result as determination information. The key input information storage unit stores every hour the determination information input from the key input determination unit. The program storage unit stores a program. The time decision unit decides time for issuing a program download request to a server, on the basis of the determination information stored in the key input information storage unit when the program stored in the program storage unit needs to be updated. The download execution unit downloads the program at the time determined by the time decision unit. The program update unit updates the program in the program storage unit in accordance with the downloaded program. An automatic program update method for the cellular phone is also disclosed.

13 Claims, 5 Drawing Sheets

CELLULAR PHONE AND AUTOMATIC PROGRAM UPDATE METHOD USED THEREFOR

BACKGROUND OF THE INVENTION

The present invention relates to a cellular phone and automatic program update method and, more particularly, to a cellular phone and automatic program update method used therefor to update an incorporated program in accordance with a program downloaded from a server.

Conventionally, in a cellular phone, a program becomes complex along with an increase in number of functions, so that bugs are sometimes found in the program after the cellular phone appears on the market. Additionally, in order to upgrade the function, the program is sometimes updated after the cellular phone appears on the market. To cope with these situations, a cellular phone having a function of downloading and updating a program via a radio channel has been available. This type of cellular phone is disclosed in, e.g., reference 1 (Japanese Patent Laid-Open No. 2002-152821).

Recently, in order to avoid centralized processing in a server for controlling program downloading, a scheme of notifying a user's cellular phone of downloadable time and downloading the program at the time selected by the user is used.

However, by the scheme of notifying the user's cellular phone of the downloadable time and downloading the program at the time selected by the user, when the program needs to be updated, the user must operate the cellular phone at the time selected by him/her, resulting in a deterioration in operability.

SUMMARY OF THE INVENTION

The present invention has been made to overcome the conventional drawbacks, and has as its object to automatically update a program without user's operation in a cellular phone.

To achieve the above object, according to the present invention, a cellular phone comprises key input determination means for determining whether a key input is done, and outputting a determination result as determination information, key input information storage means for storing every hour the determination information input from the key input determination means, program storage means for storing a program, time decision means for deciding time for issuing a program download request to a server, on the basis of the determination information stored in the key input information storage means when the program stored in the program storage means needs to be updated, download execution means for downloading the program at the time determined by the time decision means, and program update means for updating the program in the program storage means in accordance with the downloaded program.

An automatic program update method comprises the steps of determining whether a key input of a cellular phone is done, and setting a determination result as determination information, storing every hour the determination information in key input information storage means, deciding time for issuing a program download request to a server, on the basis of the determination information stored in the key input information storage means when the program stored in program storage means needs to be updated, downloading the program at the determined time, and updating the program in the program storage means in accordance with the downloaded program.

DESCRIPTION OF THE PREFERRED EMBODIMENTS

Embodiments of the present invention will be described in detail below with reference to the accompanying drawings.

Figure 1:
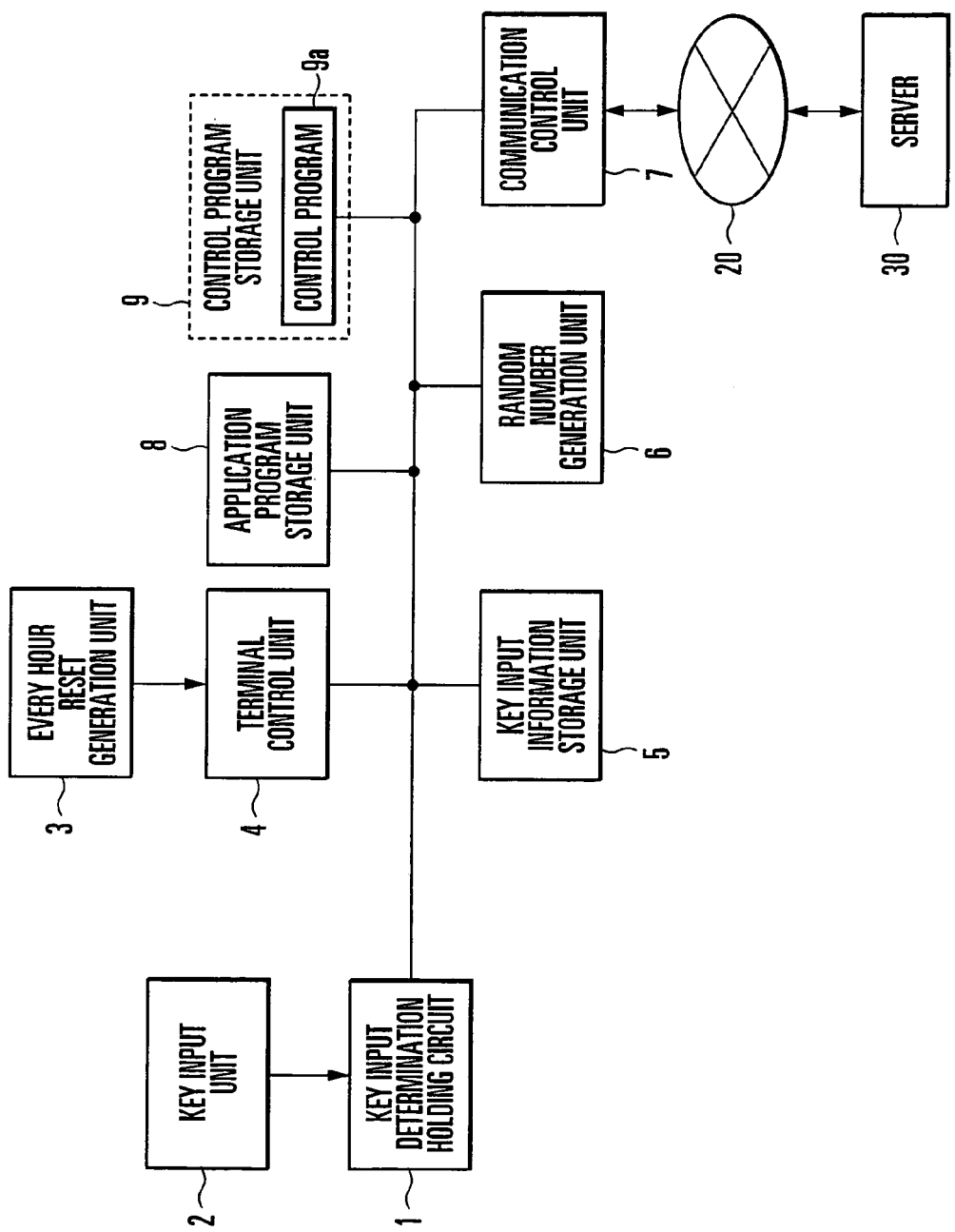
FIG. 1 is a block diagram showing an arrangement of a cellular phone according to an embodiment of the present invention.

As shown in FIG. 1, a cellular phone according to an embodiment of the present invention includes a key input determination holding circuit 1, key input unit 2, every hour reset generation unit 3, terminal control unit 4, key input information storage unit 5, random number generation unit 6, communication control unit (download execution means) 7, application program storage unit 8, and control program storage unit 9.

The application program storage unit 8 stores an application program used in this cellular phone.

The key input determination holding circuit 1 is a circuit which determines whether a key input is done by the key input unit 2, and holds and outputs the determination result as determination information. The determination information contains the presence/absence of the key input and determination time.

In order to determine whether the key input is done in one hour, the every hour reset generation unit 3 generates a timing signal every hour. For example, the every hour reset generation unit 3 generates the timing signal every 00 min and 00 sec. In short, the every hour reset generation unit 3 may generate the timing signal at an interval of one hour.

The key input information storage unit 5 stores the determination information from the key input determination holding circuit 1 every hour.

The random number generation unit 6 generates a random number.

When the application program stored in the application program storage unit 8 needs to be updated, the communication control unit 7 downloads the application program via a data communication network 20 such as the Internet from a server 30 which provides the application program.

The terminal control unit 4 controls the operations of the units in this cellular phone. More specifically, the terminal control unit 4 has a function of deciding time for downloading the application program, on the basis of the determination information stored in the key input information storage unit 5.

The control program storage unit 9 stores a control program 9a for controlling the operations of the units in this cellular phone. The control program 9a is a computer-executable program. The terminal control unit 4 executes control in accordance with the control program 9a.

The terminal control unit 4 will be described in more detail below.

Figure 2:
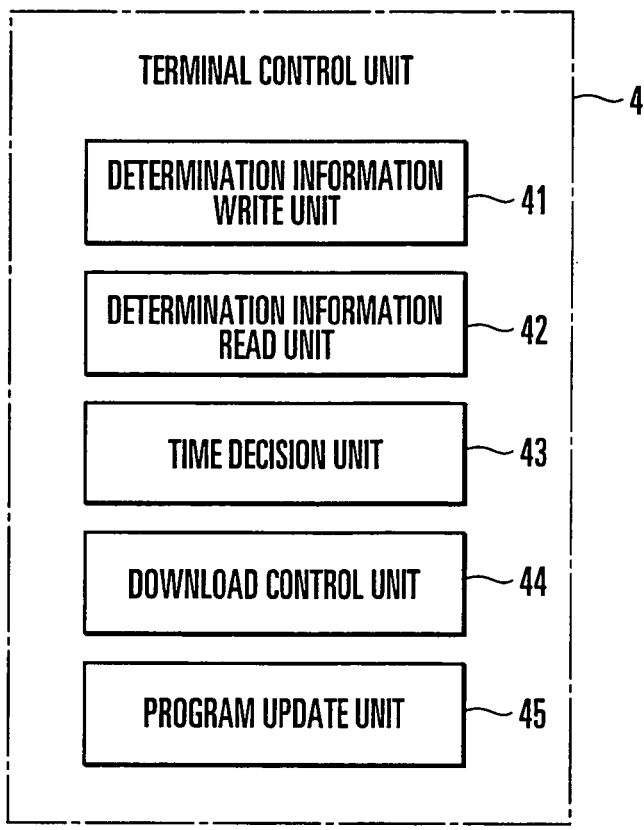
FIG. 2 is a block diagram showing an arrangement of a terminal control unit shown in FIG. 1.

As shown in FIG. 2, the terminal control unit 4 includes a determination information write unit 41, determination information read unit 42, time decision unit 43, download control unit 44, and program update unit 45.

Upon outputting the timing signal from the every hour reset generation unit 3, the determination information write unit 41 writes, in the key input information storage unit 5, the determination information held by the key input determination holding circuit 1. At this time, the determination information write unit 41 resets the key input determination holding circuit 1, and starts determining the presence/absence of the key input in the next hour.

When the application program stored in the application program storage unit 8 needs to be updated, the determination information read unit 42 reads out the determination information from the key input information storage unit 5.

On the basis of the readout determination information, the time decision unit 43 decides the time for issuing an application program download request to the server 30.

At the decided time, the download control unit 44 controls the communication control unit 7, and issues the download request to the server 30.

In accordance with the downloaded program, the program update unit 45 updates the program stored in the application program storage unit 8.

Figure 3:
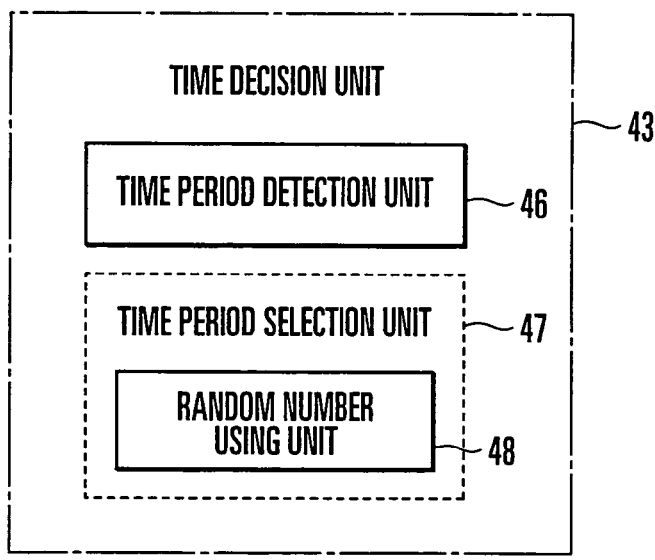
FIG. 3 is a block diagram showing an arrangement of a time decision unit shown in FIG. 2.

As shown in FIG. 3, the time decision unit 43 also includes a time period detection unit 46 and time period selection unit 47. The time period detection unit 46 detects the OFF period of the key input from the readout determination information. The time period selection unit 47 selects the ON period of the download request from the detected OFF period of the key input. The time period selection unit 47 includes a random number using unit 48 to select the ON period of the download request from the OFF period of the key input, on the basis of the random number generated by the random number generation unit 6. As described above, the selected time period is decided as the time for issuing the download request.

An automatic program update operation in the cellular phone according to the embodiment of the present invention will be described below. Note that the processes shown in FIGS. 4 and 5 are implemented by executing the control program 9a in the terminal control unit 4.

First, the operation of determining the presence/absence of the key input and storing the determination result in the key input information storage unit 5 will be described below with reference to FIG. 4.

Figure 4:
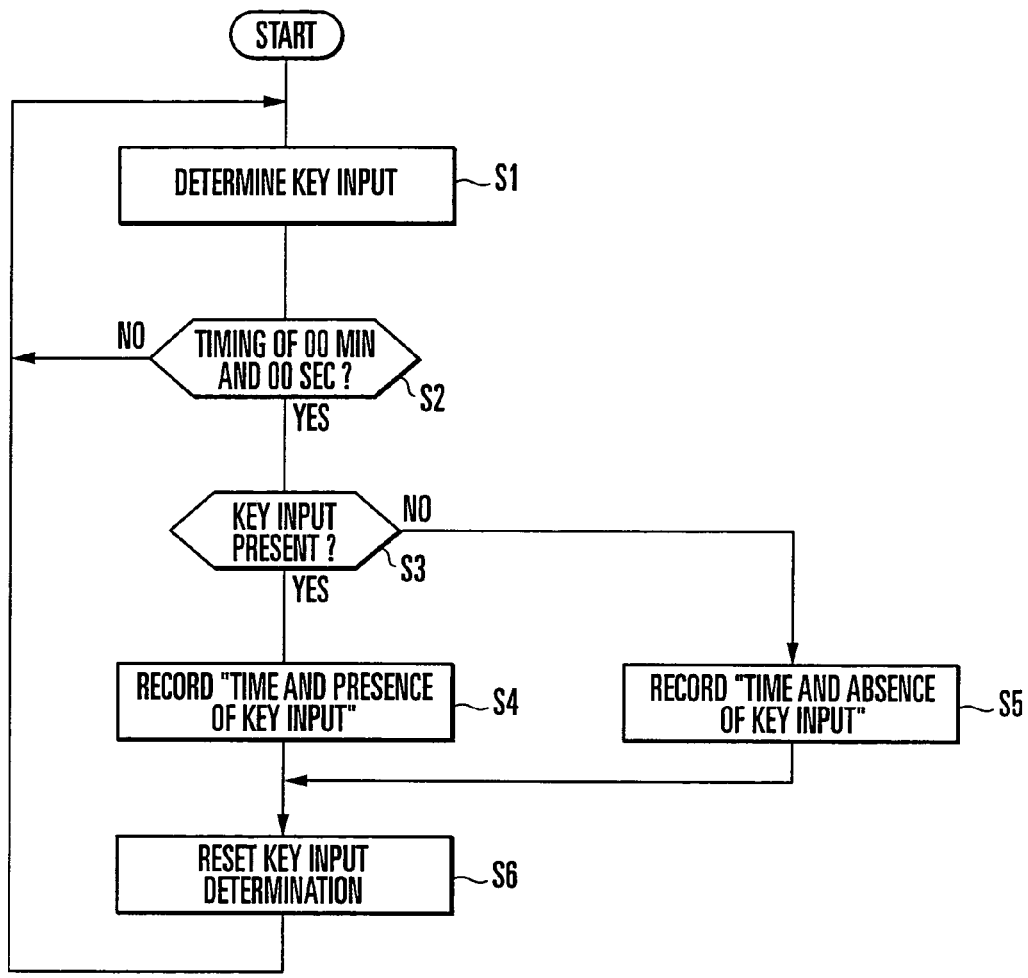
FIG. 4 is a flowchart showing an automatic program update operation in the cellular phone according to the embodiment of the present invention.
Figure 5:
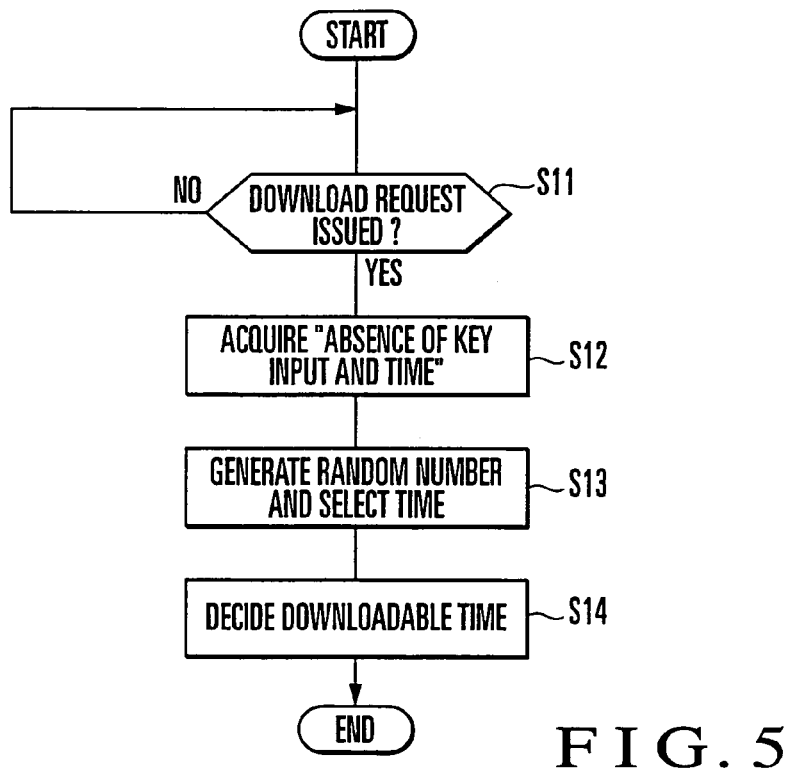
FIG. 5 is a flowchart showing the automatic program update operation in the cellular phone according to the embodiment of the present invention.

The key input determination holding circuit 1 determines the presence/absence of the input from the key input unit 2, and holds the determination result (step S1 in FIG. 4).

When a timing of 00 min and 00 sec is notified from the every hour reset generation unit 3 (YES in step S2 in FIG. 4), the terminal control unit 4 writes, in the key input information storage unit 5 every hour, the determination information indicating the presence/absence of the key input held in the key input determination holding circuit 1. More specifically, when the key input is done (YES in step S3 in FIG. 4), the terminal control unit 4 writes the presence of the key input in correspondence with the time (step S4 in FIG. 4). When no key input is done (NO in step S3 in FIG. 4), the terminal control unit 4 writes the absence of the key input in correspondence with the time (step S5 in FIG. 4). After writing the presence/absence of the key input, the terminal control unit 4 resets the key input determination holding circuit 1, and waits for the next key input determination.

The operation of deciding the time for issuing the program download request when the program is to be updated will be described with reference to FIG. 5.

When the application program needs to be updated (YES in step S11 in FIG. 5), the terminal control unit 4 reads out the OFF period of the key input from the key input information storage unit 5 (step S12 in FIG. 5). Generally, a plurality of OFF periods of the key input are read out.

On the basis of the random number generated by the random number generation unit 6, the terminal control unit 4 decides the time for issuing the program download request from the OFF periods of the key inputs read out from the key input information storage unit 5 (steps S13 and S14 in FIG. 5).

As described above, in this embodiment, when the program needs to be updated, since the time for issuing the program download request has been decided from the OFF period of the key input, the program can be automatically updated without user's operation.

In this embodiment, the time for updating the program is decided on the basis of the information indicating whether the operator's key input is done and its time period. Accordingly, the program can be updated by automatically recognizing the OFF period of the cellular phone. Hence, in this embodiment, the serviceability for the user can be improved.

Furthermore, in this embodiment, the random number generation unit 6 generates the random number, and the time for updating the program is decided on the basis of the random number. Hence, the load of the server 30 for downloading the program can be averaged.

Note that in this embodiment, since the latest period data is used for the data stored in the key input information storage unit 5, the cellular phone can cope with the change in an operator's use state.

Figure 6:
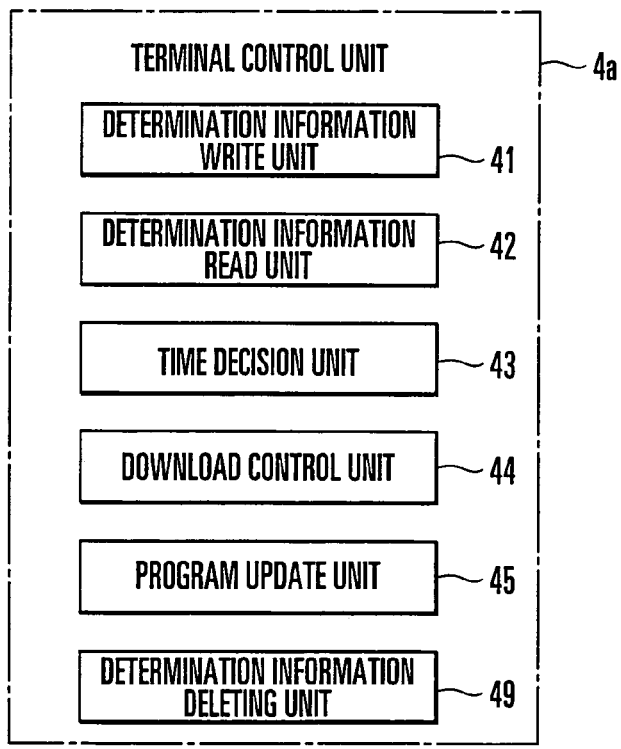
FIG. 6 is a block diagram showing another arrangement of the terminal control unit shown in FIG. 1.

The date when the presence/absence of the key input is determined is added to the determination information stored in the key input information storage unit 5. By using a determination information deleting unit 49 of a terminal control unit 4a shown in FIG. 6, the determination information stored for a time longer than a predetermined specific period is deleted from the key input information storage unit 5. Accordingly, the cellular phone can cope with the latest use state. For example, the determination information of the last week, last month, or last year can be used.

In this embodiment, the determination result indicating the presence/absence of the key input made every hour is stored in the key input information storage unit 5. However, the determination result for every predetermined time longer or shorter than one hour can also be stored in the key input information storage unit 5. For example, the every hour reset generation unit 3 may notify the terminal control unit 4 of the timing signal at a predetermined time interval longer or shorter than one hour.

Figure 7:
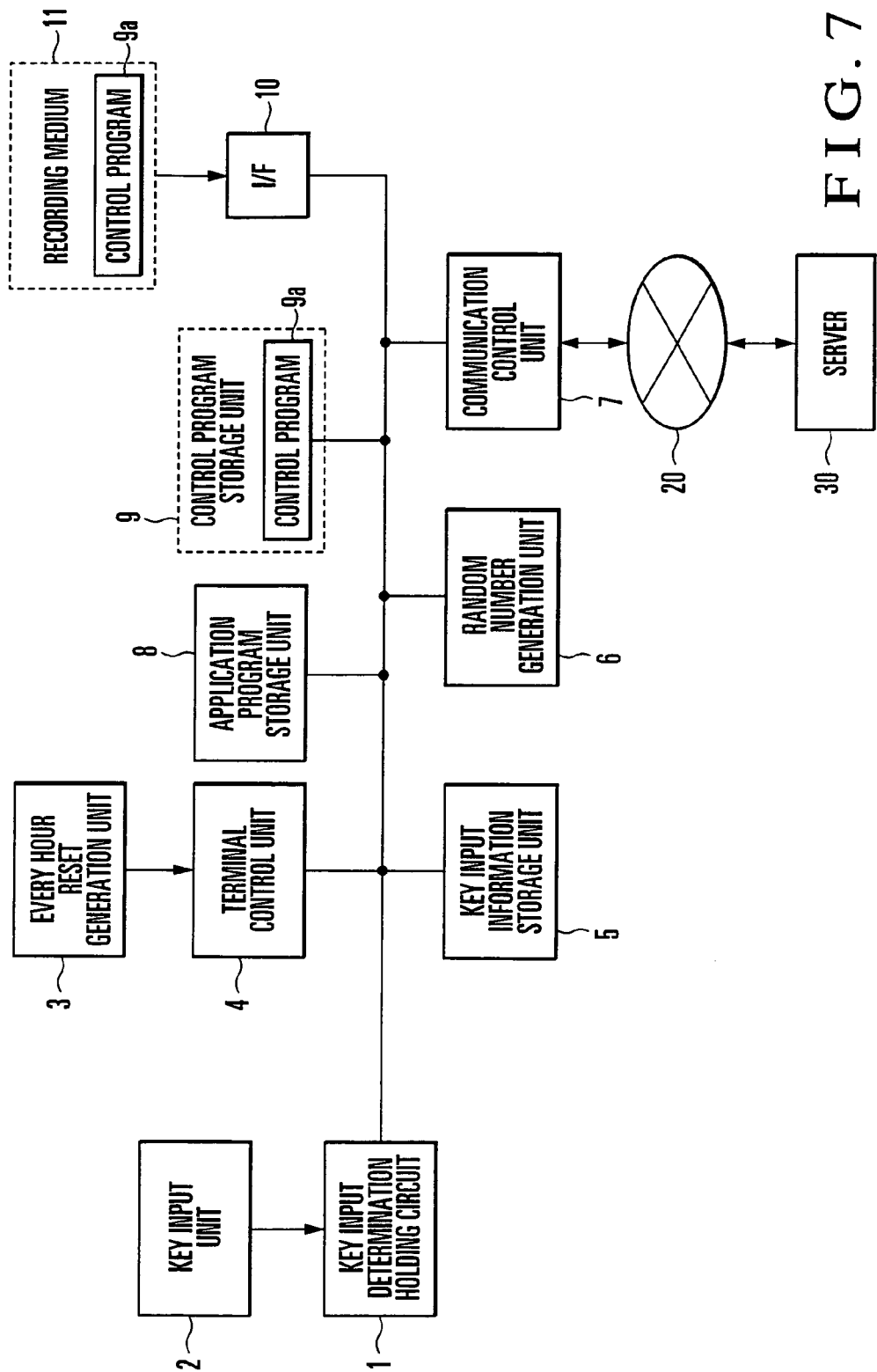
FIG. 7 is a block diagram showing an arrangement of a cellular phone according to another embodiment of the present invention.

As shown in FIG. 7, a control program 9a for controlling the operations of units in a cellular phone is provided in a state wherein it is recorded on a recording medium 11 such as an optical disk or magnetic disk. When the recording medium 11 is connected to an interface 10 of the cellular phone, the control program 9a recorded on the recording medium 11 is read out by a terminal control unit 4, and transferred to a control program storage unit 9.

What is claimed is:
1. A cellular phone comprising:
   key input determination means for determining whether a key input is done, and outputting a determination result as determination information;

key input information storage means for storing, every hour, the determination information input from said key input determination means;

program storage means for storing a program;

time decision means for deciding time for issuing a program download request to a server, on the basis of the determination information stored in said key input information storage means when the program stored in said program storage means needs to be updated;

download execution means for downloading the program at the time determined by said time decision means; and program update means for updating the program in said program storage means in accordance with the downloaded program.

2. The cellular phone of claim 1, wherein said key input information storage means stores presence/absence of the key input and determination time as the determination information every predetermined time.

3. The cellular phone of claim 2, wherein said key input information storage means stores, as the determination information, a date when the presence/absence of the key input is determined, in addition to the presence/absence of the key input and the determination time.

4. The cellular phone of claim 3, further comprising:

determination information deleting means for deleting from said key input information storage means the determination information stored for a time longer than the predetermined specific period, on the basis of the date of the determination information stored in said key input information storage means.

5. The cellular phone of claim 1, wherein said time decision means further comprises:

time period detection means for detecting an OFF period of the key input from the determination information stored in said key input information storage means; and time period selection means for selecting an ON period of the download request from the time period detected by said time period detection means.

6. The cellular phone of claim 5, further comprising:

random number generation means for generating a random number, wherein said time selection means comprises random number using means for selecting an ON period of the download request on the basis of the random number generated by said random number generation means.

7. An automatic program update method comprising:

determining whether a key input of a cellular phone is done, and setting a determination result as determination information;

storing, every hour, the determination information in key input information storage means;

deciding time for issuing a program download request to a server, on the basis of the determination information stored in the key input information storage means when the program stored in program storage means needs to be updated;

downloading the program at the determined time; and updating the program in the program storage means in accordance with the downloaded program.

8. The automatic program update method of claim 7, wherein in the storing act, presence/absence of the key input and determination time are stored as the determination information every predetermined time.

9. The automatic program update method of claim 8, wherein the deciding act further comprises:

detecting an OFF period of the key input from the determination information stored in the key input information storage means, and selecting an ON period of the download request from the detected time period.

10. The automatic program update method of claim 9, wherein the time selection act further comprises generating a random number and selecting an ON period of the download request on the basis of the random number.

11. The automatic program update method of claim 8, wherein in the storing act, a date when the presence/absence of the key input is determined is stored as the determination information, in addition to the presence/absence of the key input and the determination time.

12. The automatic program update method of claim 11, further comprising:

deleting from the key input information storage means the determination information stored for a time longer than the predetermined specific period, on the basis of the date of the determination information stored in the key input information storage means.

13. A computer readable medium containing a program for causing a computer included in a cellular phone to execute:

a process of determining whether a key input of is done, and setting a determination result as determination information;

a process of storing, every hour, the determination information in key input information storage means;

a process of deciding a time for issuing a program download request to a server on the basis of the determination information stored in the key input information storage means when the program stored in the program storage means needs to be updated;

a process of downloading the program at the determined time; and a process of updating the program stored in the program storage means in accordance with the downloaded program.

* * * * *